(12) United States Patent
Nishimura et al.

(10) Patent No.: US 11,912,264 B2
(45) Date of Patent: Feb. 27, 2024

(54) CONTROL DEVICE FOR VEHICLE

(71) Applicant: TOYOTA JIDOSHA KABUSHIKI KAISHA, Toyota (JP)

(72) Inventors: Yukimasa Nishimura, Nagoya (JP); Masahiro Nishiu, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 453 days.

(21) Appl. No.: 17/383,646

(22) Filed: Jul. 23, 2021

(65) Prior Publication Data
US 2022/0111832 A1 Apr. 14, 2022

(30) Foreign Application Priority Data
Oct. 9, 2020 (JP) ................. 2020-171557

(51) Int. Cl.
*B60W 20/50* (2016.01)
*B60K 6/26* (2007.10)
(Continued)

(52) U.S. Cl.
CPC ............... *B60W 20/50* (2013.01); *B60K 6/26* (2013.01); *B60K 6/387* (2013.01); *B60K 6/52* (2013.01);
(Continued)

(58) Field of Classification Search
CPC ...... B60W 20/50; B60W 20/40; B60W 10/02; B60W 10/06; B60W 10/08; B60W 50/029; B60W 50/038; B60W 2050/0292; B60W 2510/1005; B60W 2710/021; B60W 2710/06; B60W 2710/08; B60Y 2200/92; B60Y 2300/182; G05D 1/0061; G05D 1/0088; G05D 1/021; G05D 1/0214; G05D 1/0221; G05D 1/0223; B60K 6/26; B60K 6/387; B60K 6/52
See application file for complete search history.

(56) References Cited

U.S. PATENT DOCUMENTS

2016/0280218 A1* 9/2016 Oba ..................... B60K 6/445
2022/0063588 A1 3/2022 Suzuki et al.

FOREIGN PATENT DOCUMENTS

| CN | 105190100 A | 12/2015 |
|---|---|---|
| CN | 110667368 A * | 1/2020 |

(Continued)

*Primary Examiner* — David R Morris
(74) *Attorney, Agent, or Firm* — Oliff PLC

(57) ABSTRACT

When an abnormality associated with power transmission in a power transmission path which is formed such that power of an engine or the like is able to be transmitted to driving wheels has occurred and a vehicle speed is equal to or higher than a predetermined vehicle speed, a limp-home travel control unit switches a limp-home travel mode to a first limp-home travel mode in which the power of the engine or the like is able to be transmitted to the driving wheels through the power transmission path. When an abnormality associated with power transmission in the power transmission path has occurred and the vehicle speed is lower than the predetermined vehicle speed, the limp-home travel control unit switches the limp-home travel mode to a second limp-home travel mode in which limp-home travel is performed using power of a second electric motor.

10 Claims, 3 Drawing Sheets

(51) Int. Cl.
  *B60W 50/038* (2012.01)
  *B60W 50/029* (2012.01)
  *B60K 6/387* (2007.10)
  *B60W 10/06* (2006.01)
  *B60W 10/08* (2006.01)
  *B60W 10/02* (2006.01)
  *B60W 20/40* (2016.01)
  *B60K 6/52* (2007.10)

(52) U.S. Cl.
  CPC ............ *B60W 10/02* (2013.01); *B60W 10/06* (2013.01); *B60W 10/08* (2013.01); *B60W 20/40* (2013.01); *B60W 50/029* (2013.01); *B60W 50/038* (2013.01); *B60W 2050/0292* (2013.01); *B60W 2510/1005* (2013.01); *B60W 2710/021* (2013.01); *B60W 2710/06* (2013.01); *B60W 2710/08* (2013.01); *B60Y 2200/92* (2013.01); *B60Y 2300/182* (2013.01)

(56) References Cited

FOREIGN PATENT DOCUMENTS

| JP | 2004-232804 A | 8/2004 |
| JP | 2006-034054 A | 2/2006 |
| JP | 2007-057102 A | 3/2007 |
| JP | 2012-066609 A | 4/2012 |
| JP | 2016-037918 A | 3/2016 |
| WO | 2020/153429 A1 | 7/2020 |

\* cited by examiner

CONTROL DEVICE FOR VEHICLE

CROSS-REFERENCE TO RELATED APPLICATION

This application claims priority to Japanese Patent Application No. 2020-171557 filed on Oct. 9, 2020, incorporated herein by reference in its entirety.

BACKGROUND

1. Technical Field

The disclosure relates to a control device for a vehicle that includes an engine, a first electric motor, a second electric motor, and an automatic transmission.

2. Description of Related Art

A control device for a vehicle including an engine, a first electric motor that is connected to the engine in a power-transmittable manner, an automatic transmission that constitutes a part of a power transmission path which is formed to transmit power of the engine and power of the first electric motor to driving wheels, and a second electric motor that transmits power to the driving wheels without passing through the automatic transmission is well known. An example of a drive device for such a hybrid vehicle is described in Japanese Unexamined Patent Application Publication No. 2006-34054 (JP 2006-34054 A). JP 2006-34054 A discloses that traveling performance of a vehicle cannot be secured because a travel mode thereof is switched to a travel mode in which the automatic transmission is not used by setting transmission of power from the engine to the driving wheels to be impossible and switching the travel mode to a travel mode in which only power of the second electric motor is transmitted to the driving wheels when an abnormality in the automatic transmission has been detected.

SUMMARY

When an abnormality in the automatic transmission has been detected, a fail-safe gear stage may be formed in the automatic transmission. In this case, limp-home travel using power from the engine can be performed. However, when an abnormality in the automatic transmission has been detected and the travel mode is evenly switched to a travel mode in which only power of the second electric motor is transmitted to the driving wheels as in the technique described in JP 2006-34054 A, an opportunity to perform limp-home travel using the power of the engine cannot be obtained and there is a likelihood that a driver will feel uncomfortable due to a decrease in power performance. Here, there is a likelihood that starting performance of a vehicle in a stopped state will decrease depending on a fail-safe gear stage which is formed in the automatic transmission.

The disclosure provides a control device for a vehicle that can curb a driver's uncomfortable feeling due to a decrease in power performance and curb a decrease in starting performance when limp-home travel is performed.

According to a first aspect of the disclosure, there is provided (a) a control device for a vehicle, the vehicle including an engine, a first electric motor that is connected to the engine in a power-transmittable manner, an automatic transmission that constitutes a part of a power transmission path which is formed such that power of the engine and power of the first electric motor are able to be transmitted to driving wheels, and a second electric motor that is configured to transmit power of the second electric motor to the driving wheels without passing through the automatic transmission, the control device including a limp-home travel control unit configured to, when an abnormality associated with power transmission in the power transmission path has occurred, alternatively switch a limp-home travel mode in which predetermined limp-home travel is able to be performed between: (b) a first limp-home travel mode in which limp-home travel is performed in a state in which a fail-safe power transmission path in which the power of the engine and the power of the first electric motor are able to be transmitted to the driving wheels is formed in the power transmission path when a vehicle speed is equal to or higher than a predetermined vehicle speed; and (c) a second limp-home travel mode in which the power transmission path is switched to a power-untransmittable state in which the power of the engine and the power of the first electric motor are not able to be transmitted to the driving wheels and limp-home travel is performed using power of the second electric motor when the vehicle speed is lower than the predetermined vehicle speed.

A second aspect of the disclosure provides the control device for a vehicle according to the first aspect, wherein the driving wheels include main driving wheels to which the power of the engine and the power of the first electric motor are transmitted and sub driving wheels to which the power of the second electric motor is transmitted.

A third aspect of the disclosure provides the control device for a vehicle according to the first or second aspect, wherein the limp-home travel control unit is configured to form one of available gear stages in the automatic transmission in the first limp-home travel mode when the abnormality in the power transmission path is a breakdown in which a low-speed gear stage used to start the vehicle in the automatic transmission is unavailable.

A fourth aspect of the disclosure provides the control device for a vehicle according to any one of the first to third aspects, wherein the first electric motor is connected between the engine and the automatic transmission in the power transmission path in a power-transmittable manner, and the limp-home travel control unit is configured to switch the power transmission path to a power-untransmittable state after switching an engagement/disengagement clutch that is provided between the engine and the first electric motor in the power transmission path and cuts off connection between the engine and the first electric motor to an engaged state in the second limp-home travel mode.

A fifth aspect of the disclosure provides the control device for a vehicle according to the fourth aspect, wherein the limp-home travel control unit is configured to forcibly switch a control state of the engagement/disengagement clutch to an engaged state through a predetermined first fail-safe operation in each of the first limp-home travel mode and the second limp-home travel mode when the abnormality in the power transmission path is a breakdown in which the control state of the engagement/disengagement clutch is not able to be switched to the engaged state.

A sixth aspect of the disclosure provides the control device for a vehicle according to any one of the first to fifth aspects, wherein the limp-home travel control unit is configured to switch a start clutch, which is provided between the engine and the first electric motor and the automatic transmission in the power transmission path and that is switched from a disengaged state to an engaged state via a slipping state at the time of starting of the vehicle in a state in which the engine is operating, to a disengaged state or to switch the automatic transmission to a power-untransmittable state in the second limp-home travel mode.

A seventh aspect of the disclosure provides the control device for a vehicle according to the sixth aspect, wherein the limp-home travel control unit is configured to forcibly switch the control state of the start clutch to the engaged state through a predetermined second fail-safe operation in the first limp-home travel mode when the abnormality in the power transmission path is a breakdown in which the control state of the start clutch is not able to be switched to the engaged state.

An eighth aspect of the disclosure provides the control device for a vehicle according to any one of the first to seventh aspects, wherein the limp-home travel control unit is configured to cause the vehicle to travel using the power of the engine by switching the engine to an operating state in the first limp-home travel mode and to cause the first electric motor to generate electric power using the power of the engine by switching the engine to the operating state in the second limp-home travel mode.

A ninth aspect of the disclosure provides the control device for a vehicle according to the eighth aspect, wherein the limp-home travel control unit is configured to prohibit an intermittent engine operation of switching the engine between an operating state and a stopped state in the first limp-home travel mode.

A tenth aspect of the disclosure provides the control device for a vehicle according to any one of the first to ninth aspects, wherein the limp-home travel control unit is configured to maintain the second limp-home travel mode without switching the second limp-home travel mode to the first limp-home travel mode when the limp-home travel mode is the second limp-home travel mode and the vehicle speed is equal to or higher than the predetermined vehicle speed.

According to the first aspect, when an abnormality associated with power transmission in the power transmission path which is formed such that power of the engine and power of the first electric motor are able to be transmitted to the driving wheels has occurred and the vehicle speed is equal to or higher than the predetermined vehicle speed, the limp-home travel mode is switched to the first limp-home travel mode in which limp-home travel is performed in a state in which a fail-safe power transmission path in which the power of the engine and the power of the first electric motor are able to be transmitted to the driving wheels is formed in the power transmission path. Accordingly, it is possible to perform limp-home travel using the power of the engine and/or the first electric motor while the vehicle is traveling in a relatively high speed area. When an abnormality associated with power transmission in the power transmission path has occurred and the vehicle speed is lower than the predetermined vehicle speed, the limp-home travel mode is switched to the second limp-home travel mode in which the power transmission path is switched to a power-untransmittable state in which the power of the engine and the power of the first electric motor are not able to be transmitted to the driving wheels and limp-home travel is performed using the power of the second electric motor. Accordingly, it is possible to perform limp-home travel without using the power transmission path in which the abnormality has occurred while the vehicle is traveling in a relatively low speed area or while the vehicle is stopped. Particularly, there is a likelihood that starting performance will be decreased depending on the formed fail-safe power transmission path when the limp-home travel mode is switched to the first limp-home travel mode while the vehicle is stopped, but since the limp-home travel mode is switched to the second limp-home travel mode while the vehicle is stopped, it is possible to appropriately start the vehicle using the power of the second electric motor. Accordingly, when limp-home travel is performed, it is possible to curb a decrease in starting performance while curbing a driver's uncomfortable feeling due to a decrease in power performance.

According to the second aspect, since the driving wheels include main driving wheels to which the power of the engine and the power of the first electric motor are transmitted and sub driving wheels to which the power of the second electric motor is transmitted, it is possible to appropriately perform limp-home travel in each of the first limp-home travel mode and the second limp-home travel mode.

According to the third aspect, when the abnormality in the power transmission path is a breakdown in which a low-speed gear stage used to start the vehicle in the automatic transmission is unavailable, one of available gear stages in the automatic transmission is formed in the first limp-home travel mode and thus it is possible to form a fail-safe power transmission path in which the power of the engine and the power of the first electric motor are able to be transmitted to the driving wheels in the power transmission path.

According to the fourth aspect, since the power transmission path becomes untransmittable after the engagement/disengagement clutch that cuts off connection between the engine and the first electric motor has been switched to the engaged state in the second limp-home travel mode, it is possible to prohibit transmission of the power of the engine and the power of the first electric motor to the driving wheels and to cause the first electric motor to generate electric power using the power of the engine.

According to the fifth aspect, when the abnormality in the power transmission path is a breakdown in which the control state of the engagement/disengagement clutch is not able to be switched to the engaged state, the control state of the engagement/disengagement clutch is forcibly switched to the engaged state through a predetermined first fail-safe operation in each of the first limp-home travel mode and the second limp-home travel. Accordingly, it is possible to perform limp-home travel using the power of the engine in the first limp-home travel mode and it is possible to cause the first electric motor to generate electric power using the power of the engine in the second limp-home travel mode.

According to the sixth aspect, since the start clutch that is switched from a disengaged state to an engaged state via a slipping state at the time of starting of the vehicle in a state in which the engine is operating or the automatic transmission is switched to a power-untransmittable state in the second limp-home travel mode, it is possible to prohibit transmission of the power of the engine and the power of the first electric motor to the driving wheels.

According to the seventh aspect, when the abnormality in the power transmission path is a breakdown in which the control state of the start clutch is not able to be switched to the engaged state, the control state of the start clutch is forcibly switched to the engaged state through a predetermined second fail-safe operation in the first limp-home travel mode. Accordingly, it is possible to perform limp-home travel using the power of the engine and/or the first electric motor.

According to the eighth aspect, since limp-home travel using the power of the engine is performed by switching the engine to an operating state in the first limp-home travel mode, it is possible to curb a driver's uncomfortable feeling due to a decrease in power performance. Since the first electric motor generates electric power using the power of the engine by switching the engine to the operating state in the second limp-home travel mode, it is possible to perform series type hybrid travel and to easily maintain limp-home travel using the power of the second electric motor.

According to the ninth aspect, since an intermittent engine operation of switching the engine between an operating state and a stopped state is prohibited in the first limp-home travel mode, it is possible to maintain the operating state of the engine and it is not necessary to perform control for separating the engine from the power transmission path which needs to be performed at the time of stopping of the engine.

According to the tenth aspect, when the limp-home travel mode is the second limp-home travel mode and the vehicle speed is equal to or higher than the predetermined vehicle speed, the second limp-home travel mode is maintained without switching the second limp-home travel mode to the first limp-home travel mode and thus it is possible to simplify switching of the limp-home travel mode. In other words, when the second limp-home travel mode is maintained while the vehicle is traveling in a relatively low speed area or while the vehicle is stopped and the vehicle speed increases to a relatively high speed area, it is possible to further curb a driver's uncomfortable feeling due to a decrease in power performance in comparison with a case in which limp-home travel using the power of the engine cannot be performed when an abnormality in the power transmission path has occurred while the vehicle is traveling in the relatively high speed area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described in detail with reference to the accompanying drawings.

FIRST EMBODIMENT

Figure 1:
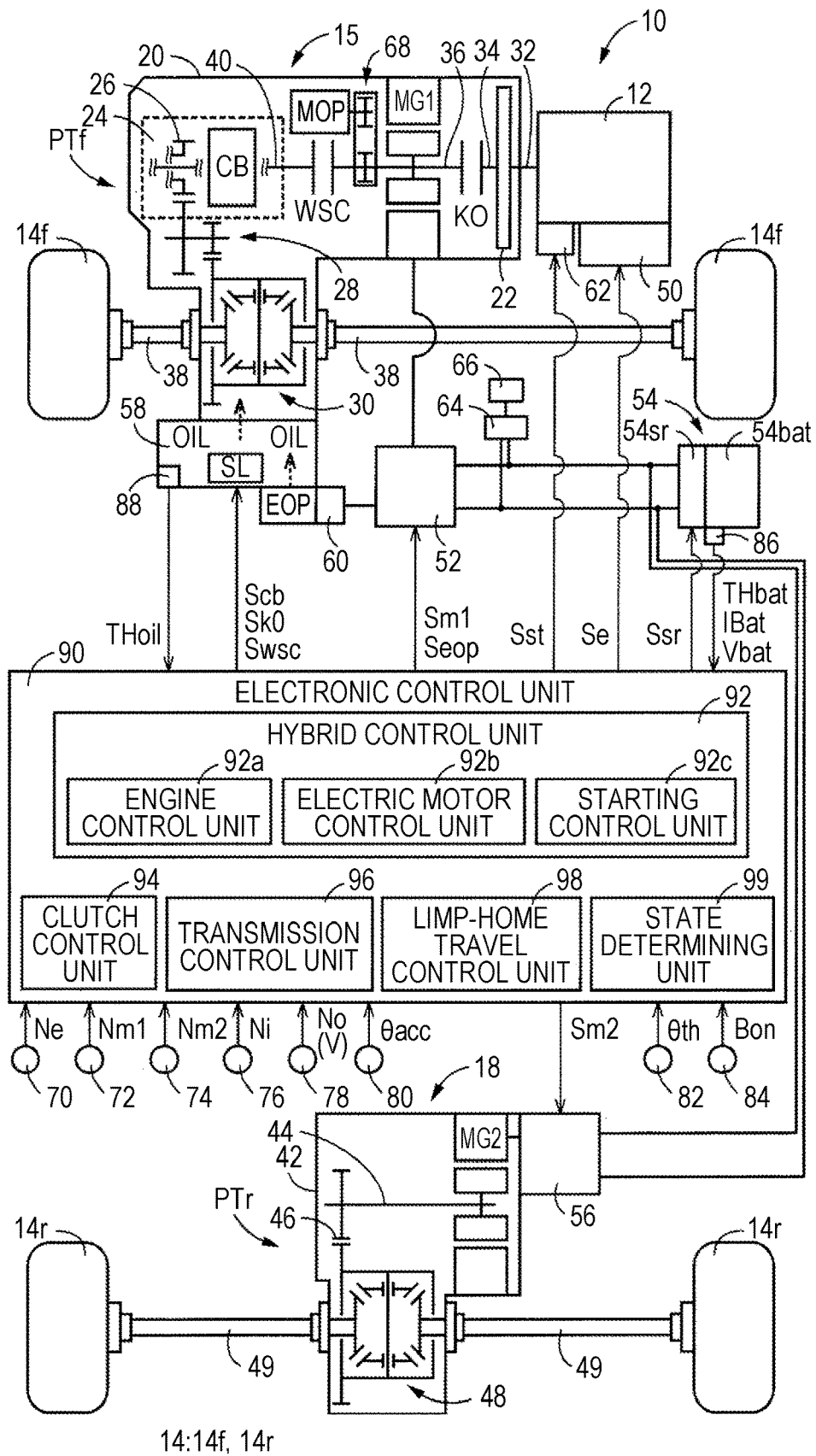
FIG. 1 is a diagram schematically illustrating a configuration of a vehicle to which the disclosure applies and illustrating principal parts of a control function and a control system for various types of control in the vehicle.

FIG. 1 is a diagram schematically illustrating a configuration of a vehicle 10 to which the disclosure is applied and illustrating principal parts of a control function and a control system for various types of control in the vehicle 10. In FIG. 1, the vehicle 10 is a hybrid vehicle including an engine 12, a first electric motor MG1, a second electric motor MG2, and driving wheels 14. The engine 12, the first electric motor MG1, and the second electric motor MG2 are driving force sources for travel. The driving wheels 14 include front wheels 14$f$ and rear wheels 14$r$. The vehicle 10 includes a front power transmission device 16 that is provided in a power transmission path between the engine 12 and the front wheels 14$f$ and a rear power transmission device 18 that is provided in a power transmission path between the second electric motor MG2 and the rear wheels 14$r$. The first electric motor MG1 is connected to the power transmission path between the engine 12 and the front wheels 14$f$ in a power-transmittable manner. The front wheels 14$f$ are main driving wheels to which power of the engine 12 and power of the first electric motor MG1 are transmitted. The rear wheels 14$r$ are sub driving wheels to which power of the second electric motor MG2 is transmitted. The vehicle 10 is a four-wheel-drive vehicle.

The engine 12 is a known internal combustion engine such as a gasoline engine or a diesel engine. An engine torque Te which is an output torque of the engine 12 is controlled by causing an electronic control unit 90 which will be described later to control an engine control device 50 including a throttle actuator, a fuel injection device, and an ignition device which are provided in the vehicle 10.

The first electric motor MG1 and the second electric motor MG2 are electric rotary machines having a function of a motor that generates mechanical power from electric power and a function of a power generator that generates electric power from mechanical power, and are so-called motor generators. The first electric motor MG1 is connected to a battery unit 54 provided in the vehicle 10 via a front inverter 52 provided in the vehicle 10. In the first electric motor MG1, an MG1 torque Tm1 which is an output torque of the first electric motor MG1 is controlled by causing the electronic control unit 90 which will be described later to control the front inverter 52. The second electric motor MG2 is connected to the battery unit 54 via a rear inverter 56 provided in the vehicle 10. In the second electric motor MG2, an MG2 torque Tm2 which is an output torque of the second electric motor MG2 is controlled by causing the electronic control unit 90 which will be described later to control the rear inverter 56. For example, when rotation directions of the electric motors MG1 and MG2 are positive directions which are rotation directions at the time of forward movement of the vehicle 10, the MG1 torque Tm1 and the MG2 torque Tm2 serve as powering torques at a positive torque which is an acceleration side and serve as regenerative torques at a negative torque which is a deceleration side.

Specifically, the first electric motor MG1 generates a driving force for travel using electric power which is supplied from the battery unit 54 via the front inverter 52. The first electric motor MG1 also generates electric power using power of the engine 12 or a driven force which is input from the front wheels 14$f$ side. The electric power which is generated through power generation of the first electric motor MG1 is stored in the battery unit 54 via the front inverter 52 or is consumed in the second electric motor MG2. The second electric motor MG2 generates a driving force for travel using electric power which is supplied from the battery unit 54 via the rear inverter 56 and/or electric power generated by the first electric motor MG1. The second electric motor MG2 also generates electric power using a driven force which is input from the rear wheels 14$r$ side. The electric power which is generated through power generation of the second electric motor MG2 is stored in the battery unit 54 via the rear inverter 56. The battery unit 54 is a power storage device that delivers and receives electric power to and from the first electric motor MG1 and the second electric motor MG2.

The front power transmission device 16 includes a damper 22, an engagement/disengagement clutch K0, a start clutch WSC, and an automatic transmission 24 in a front case 20 which is a non-rotary member attached to a vehicle body. The front power transmission device 16 includes a reduction gear mechanism 28 that is connected to a transmission output gear 26 which is an output rotary member of the automatic transmission 24 and a front differential 30 which is a front differential gear connected to the reduction gear mechanism 28 in the front case 20. The damper 22 is provided between the engine 12 and the engagement/disengagement clutch K0 in a front power transmission path PTf which is a power transmission path formed such that the power of the engine 12 and the power of the first electric motor MG1 can be transmitted to the front wheels 14f. The engagement/disengagement clutch K0 is provided between the engine 12 and the first electric motor MG1 in the front power transmission path PTf. The start clutch WSC is provided between the engine 12 and the first electric motor MG1 and the automatic transmission 24 in the front power transmission path PTf. The automatic transmission 24 is connected to the engine 12 via the engagement/disengagement clutch K0 and the start clutch WSC and is connected to the first electric motor MG1 via the start clutch WSC.

The front power transmission device 16 includes an engine connection shaft 32 that connects the engine 12 and the damper 22, a damper connection shaft 34 that connects the damper 22 and the engagement/disengagement clutch K0, an MG1 connection shaft 36 that connects the engagement/disengagement clutch K0 and the start clutch WSC, and a front axle 38 that is a pair of front drive shafts connected to the front differential 30.

The first electric motor MG1 is connected to the MG1 connection shaft 36 in a power-transmittable manner in the front case 20. That is, the first electric motor MG1 is connected between the engine 12 and the automatic transmission 24, particularly between the engagement/disengagement clutch K0 and the start clutch WSC, in the front power transmission path PTf in a power-transmittable manner. Accordingly, the first electric motor MG1 is connected to the engine 12 via the engagement/disengagement clutch K0 in a power-transmittable manner, and is connected to the automatic transmission in a power-transmittable manner without passing through the engagement/disengagement clutch K0. In other words, the automatic transmission 24 constitutes a part of a power transmission path between the engine 12 and the front wheels 14f, particularly, a part of a power transmission path between the first electric motor MG1 and the front wheels 14f.

The engine connection shaft 32, the damper 22, the damper connection shaft 34, the engagement/disengagement clutch K0, the MG1 connection shaft 36, the start clutch WSC, the automatic transmission 24, the reduction gear mechanism 28, the front differential 30, the front axle 38, and the like constitute a part of the front power transmission path PTf. The front power transmission path PTf is formed when both the engagement/disengagement clutch K0 and the start clutch WSC are in the engaged state and the automatic transmission 24 is in a power-transmittable state.

The damper 22 includes, for example, an elastic member such as a compression coil spring and is a so-called torsional damper that absorbs torque variation of the engine 12 or absorbs torsional vibration.

The engagement/disengagement clutch K0 is, for example, a wet or dry frictional engagement device which is constituted by a multi-disc or single-disc clutch which is pressed by an actuator. An operation state, that is, a control state, such as an engaged state, a disengaged state, or a slipping state of the engagement/disengagement clutch K0 is switched when a K0 torque Tk0 which is a torque capacity of the engagement/disengagement clutch K0 is changed by a K0 hydraulic pressure PRk0 which is an adjusted engagement hydraulic pressure of the engagement/disengagement clutch K0 which is supplied from a hydraulic pressure control circuit 58 provided in the vehicle 10.

An input-side member of the engagement/disengagement clutch K0 is integrally connected to the damper connection shaft 34. An output-side member of the engagement/disengagement clutch K0 is integrally connected to the MG1 connection shaft 36. The engagement/disengagement clutch K0 serves as a clutch that sets up or cuts off a power transmission path between the engine 12 and the first electric motor MG1, that is, a clutch that connects and disconnects the engine 12 to and from the first electric motor MG1. In a state in which the engagement/disengagement clutch K0 is engaged, the engine 12 and the first electric motor MG1 are connected via the damper 22 in a power-transmittable manner. In a state in which the engagement/disengagement clutch K0 is disengaged, transmission of power between the engine 12 and the first electric motor MG1 is cut off. That is, the engagement/disengagement clutch K0 is an engagement/disengagement clutch that connects the engine 12 and the first electric motor MG1 in the engaged state and cuts off connection between the engine 12 and the first electric motor MG1 in the disengaged state.

The start clutch WSC is, for example, a wet or dry frictional engagement device which is constituted by a multi-disc or single-disc clutch which is pressed by an actuator. A control state such as an engaged state, a disengaged state, or a slipping state of the start clutch WSC is switched when a WSC torque Twsc which is a torque capacity of the start clutch WSC is changed by a WSC hydraulic pressure PRwsc which is an adjusted engagement hydraulic pressure of the start clutch WSC which is supplied from the hydraulic pressure control circuit 58.

An input-side member of the start clutch WSC is integrally connected to the MG1 connection shaft 36. An output-side member of the start clutch WSC is integrally connected to a transmission input shaft 40 which is an input rotary member of the automatic transmission 24. In a state in which the start clutch WSC is engaged, power of the engine 12 and power of the first electric motor MG1 can be transmitted to the automatic transmission 24. In a state in which the start clutch WSC is disengaged, transmission of power from the engine 12 and the first electric motor MG1 to the automatic transmission 24 is cut off.

The automatic transmission 24 is, for example, a known planetary gear type automatic transmission including one or more planetary gear units which are not illustrated and a plurality of engagement devices CB. Each engagement device CB is, for example, a hydraulic frictional engagement device which is constituted by a multi-disc or single-disc clutch or brake which is pressed by a hydraulic actuator, a band brake which is tightened by the hydraulic actuator, and the like. A control state such as an engaged state, a disengaged state, or a slipping state of each engagement device CB is switched when a CB torque Tcb which is a torque capacity of the engagement device CB is changed by a CB hydraulic pressure PRcb which is an adjusted engagement hydraulic pressure of the engagement device CB which is supplied from the hydraulic pressure control circuit 58.

The automatic transmission 24 is a stepped transmission in which one gear stage out of a plurality of gear shift stages (also referred to as gear stages) with different gear shift ratios (also referred to as gear ratios) γat (=AT input rotation speed Ni/AT output rotation speed No) is formed by engagement of one engagement device out of the engagement devices CB. For example, in the automatic transmission 24, the gear stage which is formed is switched, that is, a plurality of gear stages is selectively formed, according to a driver's operation of an accelerator pedal, a vehicle speed V, or the like by an electronic control unit 90 which will be described later. The AT input rotation speed Ni is a rotation speed of the transmission input shaft 40 and is an input rotation speed of the automatic transmission 24. The AT input rotation speed Ni is also a rotation speed of an output-side member of the start clutch WSC. The AT output rotation speed No is a rotation speed of the transmission output gear 26 and is also an output rotation speed of the automatic transmission 24. The automatic transmission 24 falls into a neutral state in which no gear stage is formed, for example, by disengaging all the engagement devices CB. When the automatic transmission 24 is in the neutral state, the automatic transmission 24 is in a power-untransmittable state in which power cannot be transmitted.

In the front power transmission device 16, power output from the engine 12 is transmitted from the engine connection shaft 32 to the front wheels 14f sequentially through the damper 22, the damper connection shaft 34, the engagement/disengagement clutch K0, the MG1 connection shaft 36, the start clutch WSC, the automatic transmission 24, the reduction gear mechanism 28, the front differential 30, the front axle 38, and the like when the engagement/disengagement clutch K0 and the start clutch WSC are both engaged. In the front power transmission device 16, power output from the first electric motor MG1 is transmitted from the MG1 connection shaft 36 to the front wheels 14f sequentially through the start clutch WSC, the automatic transmission 24, the reduction gear mechanism 28, the front differential 30, the front axle 38, and the like regardless of the control state of the engagement/disengagement clutch K0 when the start clutch WSC is engaged. The power is synonymous with a torque or a force when they are not particularly distinguished.

The rear power transmission device 18 includes an MG2 connection shaft 44, a pinion 46 that is fixed to the MG2 connection shaft 44 such that relative rotation is not possible, and a rear differential 48 which is a rear differential gear connected to the pinion 46 in a rear case 42 which is a non-rotary member attached to the vehicle body. The rear power transmission device 18 includes a rear axle 49 which is a pair of rear drive shafts connected to the rear differential 48.

The second electric motor MG2 is connected to the MG2 connection shaft 44 in a power-transmittable manner in the rear case 42. Accordingly, the second electric motor MG2 is a driving force source that transmits power to the rear wheels 14r which are driving wheels 14 other than the front wheels 14f without using the automatic transmission 24. The MG2 connection shaft 44, the pinion 46, the rear differential 48, the rear axle 49, and the like constitute a power transmission path between the second electric motor MG2 and the rear wheels 14r, that is, a part of a rear power transmission path PTr that is a power transmission path which is formed to transmit power of the second electric motor MG2 to the rear wheels 14r.

In the rear power transmission path PTr, the power output from the second electric motor MG2 is transmitted from the MG2 connection shaft 44 to the rear wheels 14r sequentially through the pinion 46, the rear differential 48, the rear axle 49, and the like.

The vehicle 10 additionally includes a mechanical pump MOP which is a mechanical oil pump, an electric pump EOP which is an electric oil pump, a pump motor 60, a starter 62 that rotationally drives the engine 12 at the time of starting of the engine, a DC/DC converter 64 that is connected to the battery unit 54, and an auxiliary machinery battery 66 that is connected to the DC/DC converter 64.

The mechanical pump MOP is connected to the MG1 connection shaft 36, for example, via a transmission member 68 including a sprocket and a chain. The mechanical pump MOP is rotationally driven to eject a hydraulic oil OIL by the engine 12 and/or the first electric motor MG1. The pump motor 60 is a motor dedicated for the electric pump EOP for rotationally driving the electric pump EOP. The electric pump EOP is rotationally driven to eject a hydraulic oil OIL by the pump motor 60. The electric pump EOP is rotationally driven, for example, when the operation of the engine 12 is stopped. The pump motor 60 is connected to the battery unit 54 via the front inverter 52. An operation state of the pump motor 60 when the electric pump EOP is rotationally driven is controlled by causing the electronic control unit 90 which will be described later to control the front inverter 52. The hydraulic oil OIL ejected from the mechanical pump MOP or the electric pump EOP is supplied to the hydraulic pressure control circuit 58. The hydraulic pressure control circuit 58 supplies a K0 hydraulic pressure PRk0, a WSC hydraulic pressure PRwsc, a CB hydraulic pressure PRcb, and the like which have been adjusted based on the hydraulic oil OIL ejected from the mechanical pump MOP and/or the electric pump EOP. For example, the hydraulic oil OIL also serves as a lubricant which is used for lubrication of the constituents of the front power transmission device 16.

The battery unit 54 includes, for example, a battery pack 54bat which is a rechargeable secondary battery such as a lithium-ion battery pack or a nickel-hydride battery pack and a system relay 54sr that is disposed between the front inverter 52 and the like and the battery pack 54bat. The battery pack 54bat is a high-voltage battery that stores electric power with a higher voltage than that of the auxiliary machinery battery 66. The system relay 54sr performs engagement or disengagement of an electrical path between the front inverter 52 and the like and the battery pack 54bat, that is, performs connection and disconnection of the battery pack 54bat to and from the front inverter 52 and the like, using the electronic control unit 90 which will be described later. The auxiliary machinery battery 66 is charged, for example, with electric power supplied from the battery unit 54 by the DC/DC converter 64.

The vehicle 10 further includes an electronic control unit 90 that is a controller including a control device for the vehicle 10 associated with limp-home travel. The electronic control unit 90 includes, for example, a so-called microcomputer including a CPU, a RAM, a ROM, and input and output interfaces and performs various types of control of the vehicle 10 by causing the CPU to perform signal processing in accordance with a program which is stored in advance in the ROM using a temporary storage function of the RAM. The electronic control unit 90 includes a computer for engine control, a computer for electric motor control, a computer for hydraulic pressure control, and the like according to necessity.

Various signals (for example, an engine rotation speed Ne that is a rotation speed of the engine 12, an MG1 rotation speed Nm1 that is a rotation speed of the first electric motor MG1, an MG2 rotation speed Nm2 that is a rotation speed of the second electric motor MG2, an AT input rotation speed Ni, an AT output rotation speed No corresponding to a vehicle speed V, an accelerator operation amount θacc that is a driver's amount of operation of an accelerator pedal indicating the magnitude of the driver's accelerating operation, a throttle valve opening θth that is an opening of an electronic throttle valve, a brake-on signal Bon that is a signal indicating a state in which a brake pedal for operating wheel brakes is operated by the driver, a battery temperature THbat, a battery charging/discharging current Ibat, or a battery voltage Vbat of the battery unit 54, and a hydraulic oil temperature THoil that is the temperature of a hydraulic oil in the hydraulic pressure control circuit 58) based on detection values from various sensors (for example, an engine rotation speed sensor 70, an MG1 rotation speed sensor 72, an MG2 rotation speed sensor 74, an input rotation speed sensor 76, an output rotation speed sensor 78, an accelerator operation amount sensor 80, a throttle valve opening sensor 82, a brake switch 84, a battery sensor 86, and an oil temperature sensor 88) provided in the vehicle 10 are supplied to the electronic control unit 90.

Various command signals (for example, an engine control command signal Se for controlling the engine 12, an MG1 control command signal Sm1 for controlling the first electric motor MG1, an EOP control command signal Seop for controlling rotational driving of the electric pump EOP using the pump motor 60, a relay control command signal Ssr for controlling opening/closing of the system relay 54sr, an MG2 control command signal Sm2 for controlling the second electric motor MG2, a CB hydraulic pressure control command signal Scb for controlling the engagement devices CB, a K0 hydraulic pressure control command signal Sk0 for controlling the engagement/disengagement clutch K0, a WSC hydraulic pressure control command signal Swsc for controlling the start clutch WSC, and a starter control command signal Sst for controlling the starter 62) are output from the electronic control unit 90 to various devices (for example, an engine control device 50, the front inverter 52, the battery unit 54, the rear inverter 56, the hydraulic pressure control circuit 58, and the starter 62) provided in the vehicle 10.

In order to realize various types of control in the vehicle 10, the electronic control unit 90 includes a hybrid control means, that is, a hybrid control unit 92, a clutch control means, that is, a clutch control unit 94, and a transmission control means, that is, a transmission control unit 96.

The hybrid control unit 92 has a function of an engine control means, that is, an engine control unit 92a, and a function of an electric motor control means, that is, an electric motor control unit 92b. The engine control unit 92a controls the operation of the engine 12. The electric motor control unit 92b controls the operation of the first electric motor MG1 via the front inverter 52 and controls the operation of the second electric motor MG2 via the rear inverter 56. The hybrid control unit 92 performs hybrid driving control using the engine 12, the first electric motor MG1, and the second electric motor MG2 based on the control functions of the engine control unit 92a and the electric motor control unit 92b.

The hybrid control unit 92 calculates a required drive amount which is required for the vehicle 10 by a driver, for example, by applying the accelerator operation amount eacc and the vehicle speed V to a required drive amount map. The required drive amount map is a relationship acquired by experiment or design and stored in advance, that is, a predetermined relationship. The required drive amount is, for example, a required drive torque Trdem [Nm] in the driving wheels 14. In other words, the required drive torque Trdem is a required drive power Prdem [W] at the vehicle speed V at that time. A required driving force Frdem [N] in the driving wheels 14 or the like may be used as the required drive amount. An AT output rotation speed No or the like may be used instead of the vehicle speed V to calculate the required drive amount.

The hybrid control unit 92 outputs an engine control command signal Se for controlling the engine 12, an MG1 control command signal Sm1 for controlling the first electric motor MG1, and an MG2 control command signal Sm2 for controlling the second electric motor MG2 such that the required drive power Prdem is realized in consideration of a transmission loss, an auxiliary-machinery load, a gear shift ratio γat of the automatic transmission 24, chargeable electric power Win and dischargeable electric power Wout of the battery unit 54, a driving force distribution to front and rear wheels in the vehicle 10, and the like. The engine control command signal Se is, for example, a command value for an engine power Pe which is the power of the engine 12 for outputting the engine torque Te at the engine rotation speed Ne at that time. The MG1 control command signal Sm1 is, for example, a command value for power consumption Wm1 of the first electric motor MG1 for outputting the MG1 torque Tm1 at the MG1 rotation speed Nm1 at that time. The MG2 control command signal Sm2 is, for example, a command value for power consumption Wm2 of the second electric motor MG2 for outputting the MG2 torque Tm2 at the MG2 rotation speed Nm2 at that time.

The driving force distribution to the front and rear wheels in the vehicle 10 is distribution of a driving force to the front wheels 14f and the rear wheels 14r. The driving force distribution to the front and rear wheels in the vehicle 10 is calculated, for example, based on traveling conditions of the vehicle 10 determined using the output rotation speed sensor 78 or an acceleration sensor which is not illustrated, road conditions of a travel road, or the like by the electronic control unit 90.

Chargeable electric power Win of the battery unit 54 is maximum input electric power for defining a limit of input electric power of the battery unit 54 and represents an input limit of the battery unit 54. Dischargeable electric power Wout of the battery unit 54 is maximum output electric power for defining a limit of output electric power of the battery unit 54 and represents an output limit of the battery unit 54. The chargeable electric power Win or the dischargeable electric power Wout of the battery unit 54 is calculated, for example, based on the battery temperature THbat and a state of charge value SOC [%] of the battery unit 54 by the electronic control unit 90. The state of charge value SOC of the battery unit 54 is a value indicating a state of charge corresponding to an amount of electric power charged in the battery unit 54 and is calculated, for example, based on the battery charging/discharging current Ibat and the battery voltage Vbat by the electronic control unit 90.

For example, when the required drive torque Trdem can be covered with only the outputs of the electric motors MG1 and MG2, the hybrid control unit 92 sets a travel mode to a motor-driven travel (=EV travel) mode. In the EV travel mode, the hybrid control unit 92 performs, for example, EV travel in which the vehicle travels using only the electric motors MG1 and MG2 as driving force sources in a state in which the engagement/disengagement clutch K0 is disengaged. As will be described later, the start clutch WSC is basically maintained in the engaged state while the vehicle 10 is traveling.

On the other hand, when the required drive torque Trdem cannot be covered without using at least the output of the engine 12, the hybrid control unit 92 sets the travel mode to an engine-driven travel mode, that is, a hybrid travel (=HV travel) mode. In the HV travel mode, the hybrid control unit 92 performs, for example, engine-driven travel, that is, HV travel in which the vehicle travels using at least the engine 12 as a driving force source in a state in which the engagement/disengagement clutch K0 is engaged.

On the other hand, when the required drive torque Trdem can be covered with only the outputs of the electric motors MG1 and MG2 and when the state of charge value SOC of the battery unit 54 is less than a predetermined engine start threshold value or when warming-up of the engine 12 or the like is necessary, the hybrid control unit 92 sets the travel mode to the HV travel mode. The engine start threshold value is a predetermined threshold value for determining whether the state of charge value SOC indicates that the battery unit 54 needs to be charged by forcibly starting the engine 12.

In this way, the hybrid control unit 92 switches the travel mode between the EV travel mode and the HV travel mode by automatically stopping the engine 12 during HV travel, restarting the engine 12 after the engine has been stopped, starting the engine 12 during EV travel, or automatically stopping the engine 12 or starting the engine 12 while the vehicle stops based on the required drive torque Trdem and the like.

The hybrid control unit 92 determines whether there is a request for starting the engine 12. For example, the hybrid control unit 92 determines whether there is a request for starting the engine 12 based on whether the required drive torque Trdem exceeds a range which can be covered with only the outputs of the electric motors MG1 and MG2, whether warming-up of the engine 12 or the like is necessary, whether the state of charge value SOC of the battery unit 54 is less than the engine start threshold value, or the like in the EV travel mode.

The clutch control unit 94 controls the engagement/disengagement clutch K0 such that start control of the engine 12 is performed. For example, when the hybrid control unit 92 determines that there is a request for starting the engine 12, the clutch control unit 94 outputs the K0 hydraulic pressure control command signal Sk0 for controlling the engagement/disengagement clutch K0 from the disengaged state to the engaged state to the hydraulic pressure control circuit 58 such that the K0 torque TkO for transmitting a torque required to crank the engine 12 and used to increase the engine rotation speed Ne to the engine 12 side is obtained. That is, the clutch control unit 94 outputs the K0 hydraulic pressure control command signal Sk0 for controlling an actuator to the hydraulic pressure control circuit 58 such that the control state of the engagement/disengagement clutch K0 is switched from the disengaged state to the engaged state at the time of starting of the engine 12. In this embodiment, the torque required to crank the engine 12 is referred to as a required cranking torque Tcrn.

The hybrid control unit 92 has a function of a start control means, that is, a start control unit 92c. The start control unit 92c controls the engine 12 and the first electric motor MG1 such that start control of the engine 12 is performed. When the hybrid control unit 92 determines that there is a request for starting the engine 12, the start control unit 92c outputs an MG1 control command signal Sm1 for causing the first electric motor MG1 to output the required cranking torque Tcrn to the front inverter 52 in synchronization with switching of the engagement/disengagement clutch K0 to the engaged state by the clutch control unit 94. That is, the start control unit 92c outputs the MG1 control command signal Sm1 for controlling the first electric motor MG1 to the front inverter 52 such that the first electric motor MG1 outputs the required cranking torque Tcrn at the time of starting of the engine 12.

When the hybrid control unit 92 determines that there is a request for starting the engine 12, the start control unit 92c outputs an engine control command signal Se for starting supply of fuel, ignition of the engine, or the like to the engine control device 50 in synchronization with cranking of the engine 12 by the engagement/disengagement clutch K0 and the first electric motor MG1. That is, the start control unit 92c outputs the engine control command signal Se for controlling the engine 12 such that the engine 12 starts its operation to the engine control device 50 at the time of starting of the engine 12.

At the time of cranking of the engine 12, a cranking reaction torque Trfcr which is a reaction torque accompanying engagement of the engagement/disengagement clutch K0 is generated. The cranking reaction torque Trfcr causes a feeling of drag of the vehicle 10, that is, a decrease in the drive torque Tr, due to inertia during starting of the engine in EV travel. Accordingly, the required cranking torque Tcrn output from the first electric motor MG1 when the engine 12 is started is also an MG1 torque Tm1 for cancelling the cranking reaction torque Trfcr. That is, the required cranking torque Tcrn is the K0 torque Tk0 required for cranking the engine 12 and corresponds to the MG1 torque Tm1 flowing from the first electric motor MG1 side to the engine 12 side via the engagement/disengagement clutch K0. The required cranking torque Tcrn is, for example, a constant cranking torque Tcr which is predetermined based on, for example, the specifications of the engine 12.

The start control unit 92c performs, for example, engine start control in a state in which the start clutch WSC is disengaged in the state in which the vehicle 10 stops. The start control unit 92c performs engine start control in the state in which the start clutch WSC is engaged during EV travel. The start control unit 92c causes the first electric motor MG1 to output an MG1 torque Tm1 corresponding to the required cranking torque Tcrn in addition to an MG1 torque Tm1 for EV travel, that is, an MG1 torque Tm1 for generating the drive torque Tr, at the time of starting of the engine 12 in EV travel. Accordingly, in EV travel, it is necessary to secure the torque corresponding to the required cranking torque Tcrn in preparation for starting of the engine 12. As a result, a range in which the required drive torque Trdem can be covered with only the outputs of the electric motors MG1 and MG2 is a torque range obtained by subtracting the required cranking torque Tcrn from maximum output torques of the electric motors MG1 and MG2. The maximum output torques of the electric motors MG1 and MG2 are maximum output torques of the electric motors MG1 and MG2 which can be output using the dischargeable electric power Wout of the battery unit 54.

The transmission control unit 96 performs gear shift determination of the automatic transmission 24, for example, using a gear shift map which is a predetermined relationship and outputs a CB hydraulic pressure control command signal Scb for performing gear shift control by switching the control states of the engagement devices CB such that the gear stage of the automatic transmission 24 is switched according to necessity to the hydraulic pressure control circuit 58. The gear shift map is, for example, a predetermined relationship with gear shift lines used to determine gear shift of the automatic transmission 24 on a two-dimensional coordinate system with the vehicle speed V and the required drive torque Trdem as variables. In the gear shift map, the AT output rotation speed No or the like may be used instead of the vehicle speed V and the required driving force Frdem, the accelerator operation amount θacc, or the throttle valve opening θth may be used instead of the required drive torque Trdem.

The clutch control unit 94 controls the start clutch WSC such that the start clutch WSC is maintained in the disengaged state when the vehicle 10 is in a stopped state. The clutch control unit 94 controls the start clutch WSC such that the start clutch WSC slides and is switched from the disengaged state to the engaged state at the time of starting of the vehicle 10. The clutch control unit 94 controls the start clutch WSC such that the start clutch WSC is maintained in the engaged state while the vehicle 10 is traveling. The clutch control unit 94 controls the start clutch WSC such that the start clutch WSC is switched from the engaged state to the disengaged state while the vehicle 10 transitions from the traveling state to the stopped state. When the vehicle 10 is in the stopped state in the EV travel mode and the start control of the engine 12 is not performed, the start clutch WSC does not have to be in the disengaged state.

As described above, the start clutch WSC is switched from the disengaged state to the engaged state via the slipping state at least at the time of starting of the vehicle 10 in the state in which the engine 12 is operating. Since the vehicle 10 performs slipping start using the start clutch WSC, for example, a contact area of a frictional member in the start clutch WSC increases or the number of frictional plates increases in comparison with frictional engagement devices such as the engagement devices CB in the automatic transmission 24.

In the front power transmission device 16, an abnormality associated with transmission of power from the engine 12 or the first electric motor MG1 in the front power transmission path PTf may occur. In this case, certain limp-home travel LH needs to be performed.

The electronic control unit 90 further includes a limp-home travel control means, that is, a limp-home travel control unit 98, to perform the limp-home travel LH.

The limp-home travel control unit 98 sets a limp-home travel mode Mlh in which predetermined limp-home travel LHf can be performed when an abnormality associated with transmission of power in the front power transmission path PTf occurs.

The predetermined limp-home travel LHf is, for example, limp-home travel LH which is performed in a state in which a fail-safe power transmission path PTffs in which power of the engine 12 and power of the first electric motor MG1 can be transmitted to the front wheels 14f is formed in the front power transmission path PTf, that is, first limp-home travel LH1. Alternatively, the predetermined limp-home travel LHf is, for example, limp-home travel LH which is performed using power of the second electric motor MG2 in a state in which the front power transmission path PTf is switched to a power-untransmittable state in which power of the engine 12 and power of the first electric motor MG1 cannot be transmitted to the front wheels 14f, that is, second limp-home travel LH2.

When an abnormality associated with transmission of power in the front power transmission path PTf has occurred and the second limp-home travel LH2 is performed, limp-home travel LH can be performed without using the front power transmission path PTf in which the abnormality has occurred and starting of the vehicle can be performed using power of the second electric motor MG2. However, there is a likelihood that an opportunity to perform limp-home travel LH using the power of the engine 12 will not be obtained and a driver will feel uncomfortable due to a decrease in power performance. On the other hand, when an abnormality associated with transmission of power in the front power transmission path PTf has occurred and the first limp-home travel LH1 is performed, limp-home travel LH can be performed using the power of the engine 12. However, there is a likelihood that starting performance in the vehicle stopped state will decrease depending on the state of the fail-safe power transmission path PTffs.

When the abnormality associated with transmission of power in the front power transmission path PTf is, for example, a breakdown in which one gear stage out of a plurality of gear stages in the automatic transmission 24 becomes unavailable, it is conceivable that an available gear stage out of the plurality of gear stages in the automatic transmission 24 be formed as the fail-safe power transmission path PTffs. The breakdown in which one gear stage out of a plurality of gear stages in the automatic transmission 24 becomes unavailable is caused, for example, because one of solenoid valves for the engagement devices CB out of a plurality of solenoid valves SL in the hydraulic pressure control circuit 58 is out of order. When the unavailable gear stage in the automatic transmission 24 is a low-speed gear stage which is used to start the vehicle 10, a high-speed gear stage is formed as an available gear stage. The low-speed gear stage which is used to start the vehicle 10 is, for example, a lowest-speed gear stage, that is, a first gear stage, at which the gear ratio γat is maximized. In a vehicle in which transmission of power is performed via a known torque converter, it is likely to secure starting performance even at a high-speed gear stage other than the first gear stage. However, the vehicle 10 performs slipping start using the start clutch WSC. Accordingly, when a high-speed gear stage other than the first gear stage in the automatic transmission 24 is formed as the fail-safe power transmission path PTffs, there is a likelihood that starting performance will decrease in comparison with a case in which transmission of power is performed via the known torque converter.

When the abnormality associated with transmission of power in the front power transmission path PTf is, for example, a breakdown in which the control state of the engagement/disengagement clutch K0 cannot be switched or a breakdown in which the control state of the start clutch WSC cannot be switched, there is a likelihood that it will be difficult to continuously travel using the front power transmission path PTf. The breakdown in which the control state of the engagement/disengagement clutch K0 cannot be switched is, for example, a breakdown in which the control state of the engagement/disengagement clutch K0 cannot be switched to the engaged state due to a breakdown in which the K0 hydraulic pressure PRk0 is not output from the solenoid valves for the engagement/disengagement clutch out of the plurality of solenoid valves SL of the hydraulic pressure control circuit 58, that is, a breakdown in which the engagement/disengagement clutch K0 is in the disengaged state. The breakdown in which the control state of the start clutch WSC cannot be switched is, for example, a breakdown in which the control state of the start clutch WSC cannot be switched to the engaged state due to a breakdown in which the WSC hydraulic pressure PRwsc is not output from the solenoid valves for the start clutch out of the plurality of solenoid valves SL of the hydraulic pressure control circuit 58, that is, a breakdown in which the start clutch WSC is in the disengaged state. Alternatively, there is a likelihood that the breakdown in which the control state of the engagement/disengagement clutch K0 or the start clutch WSC cannot be switched will be caused, for example, due to a decrease in source pressure such as a line pressure which is supplied to the solenoid valves for the engagement/disengagement clutch or the solenoid valves for the start clutch for certain reasons. For example, with the breakdown in which the engagement/disengagement clutch K0 is in the disengaged state, there is a likelihood that the mechanical pump MOP may not be rotationally driven by the engine 12, the source pressure such as a line pressure supplied to the solenoid valve for the start clutch or the like may be decreased, and thus a breakdown in which the control state of the start clutch WSC cannot be switched will occur. With this breakdown, it is conceivable that the fail-safe power transmission path PTfs be formed through a fail-safe operation FS of forcibly switching the engagement/disengagement clutch K0 to the engaged state or the fail-safe power transmission path PTfs be formed through a fail-safe operation FS of forcibly switching the start clutch WSC to the engaged state. However, when the engagement/disengagement clutch K0 is forcibly switched to the engaged state, for example, there is a likelihood that the engine 12 will not be able to operate continuously or start control of the engine 12 will not be able to be performed when the vehicle has stopped and thus there is a likelihood that starting performance will decrease. Alternatively, when the start clutch WSC is forcibly switched to the engaged state, slipping start using the start clutch WSC cannot be performed. Accordingly, for example, it is necessary to perform slipping start using the engagement device CB which is in the engaged state when the first gear stage of the automatic transmission 24 is formed, and thus there is a likelihood that starting performance will decrease.

Therefore, when an abnormality associated with transmission of power in the front power transmission path PTf has occurred and the vehicle 10 is traveling in a relatively high-speed area, the limp-home travel control unit 98 performs the first limp-home travel LH1 in which limp-home travel LH can be performed using the power of the engine 12. On the other hand, when an abnormality associated with transmission of power in the front power transmission path PTf has occurred and the vehicle 10 is traveling in a relatively low-speed area or the vehicle 10 is stopped, the limp-home travel control unit 98 performs the second limp-home travel LH2 in preparation for starting of the vehicle. That is, when an abnormality associated with transmission of power in the front power transmission path PTf has occurred, the limp-home travel control unit 98 alternatively switches a limp-home travel mode Mlh between a first limp-home travel mode Mlh1 in which the first limp-home travel LH1 is performed when the vehicle speed V is equal to or higher than a predetermined vehicle speed Vf and a second limp-home travel mode Mlh2 in which the second limp-home travel LH2 is performed when the vehicle speed V is lower than the predetermined vehicle speed Vf. The predetermined vehicle speed Vf is, for example, a predetermined lower-limit vehicle speed at which it is preferable to enable engine-driven travel in limp-home travel LH and to curb a decrease in power performance. Alternatively, the predetermined vehicle speed Vf is, for example, a predetermined lower-limit vehicle speed at which occurrence of an engine stall can be avoided when the engine-driven travel is performed in limp-home travel LH. Alternatively, the predetermined vehicle speed Vf is, for example, a predetermined threshold value for performing limp-home travel LH in preparation for starting of the vehicle.

Specifically, the electronic control unit 90 further includes a state determining means, that is, a state determining unit 99, such that the limp-home travel mode Mlh is switched between the first limp-home travel mode Mlh1 and the second limp-home travel mode Mlh2.

The state determining unit 99 determines whether an abnormality associated with transmission of power in the front power transmission path PTf has occurred. Determination of whether an abnormality associated with transmission of power in the front power transmission path PTf has occurred corresponds to determination of whether an abnormality in the front power transmission path PTf in which it is difficult to start the vehicle 10 using the power of the engine 12 and/or the first electric motor MG1 has occurred.

Specifically, the state determining unit 99 detects a breakdown of each of the plurality of solenoid valves SL of the hydraulic pressure control circuit 58. When a breakdown of one of the solenoid valves for the engagement devices CB out of the solenoid valves SL has been detected, the state determining unit 99 determines whether one gear stage in the automatic transmission 24 is available or unavailable. When the breakdown in which the first gear stage in the automatic transmission 24 is unavailable has occurred, the state determining unit 99 determines that an abnormality associated with transmission of power in the front power transmission path PTf has occurred.

When a breakdown of the solenoid valve for the engagement/disengagement clutch out of the solenoid valves SL has been detected, the state determining unit 99 determines that a breakdown in which the control state of the engagement/disengagement clutch K0 cannot be switched to the engaged state has occurred. When a breakdown in which the control state of the engagement/disengagement clutch K0 cannot be switched to the engaged state has occurred, the state determining unit 99 determines that an abnormality associated with transmission of power in the front power transmission path PTf has occurred.

When a breakdown of the solenoid valve for the start clutch out of the solenoid valves SL has been detected, the state determining unit 99 determines that a breakdown in which the control state of the start clutch WSC cannot be switched to the engaged state has occurred. When a breakdown in which the control state of the start clutch WSC cannot be switched to the engaged state has occurred, the state determining unit 99 determines that an abnormality associated with transmission of power in the front power transmission path PTf has occurred.

When a source pressure failure in which the source pressure such as a line pressure which is supplied to the solenoid valve for the engagement/disengagement clutch or the solenoid valve for the start clutch is lower than a required value has occurred, the state determining unit 99 determines that an abnormality associated with transmission of power in the front power transmission path PTf has occurred.

When it is determined that an abnormality associated with transmission of power in the front power transmission path PTf has occurred, the state determining unit 99 determines whether the vehicle speed V is lower than the predetermined vehicle speed Vf.

When the state determining unit 99 determines that an abnormality associated with transmission of power in the front power transmission path PTf has occurred and that the vehicle speed V is equal to or higher than the predetermined vehicle speed Vf, the limp-home travel control unit 98 sets the first limp-home travel mode Mlh1 as the limp-home travel mode Mlh such that the first limp-home travel LH1 can be performed. On the other hand, when the state determining unit 99 determines that an abnormality associated with transmission of power in the front power transmission path PTf has occurred and that the vehicle speed V is lower than the predetermined vehicle speed Vf, the limp-home travel control unit 98 sets the second limp-home travel mode Mlh2 as the limp-home travel mode Mlh such that the second limp-home travel LH2 can be performed.

In the first limp-home travel mode Mlh1, the limp-home travel control unit 98 switches the engagement/disengagement clutch K0 and the start clutch WSC to the engaged state and forms one gear stage in the automatic transmission 24. Accordingly, the fail-safe power transmission path PTffs is formed in the front power transmission path PTf.

In the second limp-home travel mode Mlh2, the limp-home travel control unit 98 switches the engagement/disengagement clutch K0 to the engaged state. Accordingly, when the engine 12 operates, it is possible to perform generation of electric power using the first electric motor MG1 using the power of the engine 12. In the second limp-home travel mode Mlh2, the limp-home travel control unit 98 switches the start clutch WSC to the disengaged state or switches the automatic transmission 24 to a neutral state, that is, a power-untransmittable state. Accordingly, the front power transmission path PTf cannot transmit the power of the engine 12 and the power of the first electric motor MG1 to the front wheels 14f. That is, in the second limp-home travel mode Mlh2, the limp-home travel control unit 98 switches the engagement/disengagement clutch K0 to the engaged state and switches the front power transmission path PTf to a power-untransmittable state.

When a breakdown in which the first gear stage in the automatic transmission 24 is unavailable has not occurred, the limp-home travel control unit 98 forms a gear stage which is determined using the gear shift map in the first limp-home travel mode Mlh1. At this time, when there is an unavailable gear stage other than the first gear stage, a gear stage close to the unavailable gear stage is assigned instead of the unavailable gear stage. On the other hand, when an abnormality associated with transmission of power in the front power transmission path PTf is a breakdown in which the first gear stage in the automatic transmission 24 is unavailable, the limp-home travel control unit 98 forms one of available gear stages in the automatic transmission 24 in the first limp-home travel mode Mlh1. At this time, for example, the formed gear stage may be a specific fixed gear stage or may be a gear stage which is switched with reference to the gear shift map. On the other hand, in the second limp-home travel mode Mlh2, the limp-home travel control unit 98 does not form any gear stage in the automatic transmission 24, that is, switches the automatic transmission 24 to the neutral state, regardless of a breakdown in which a gear stage in the automatic transmission 24 is unavailable when the start clutch WSC is switched to the engaged state. In the second limp-home travel mode Mlh2, the limp-home travel control unit 98 may switch the automatic transmission 24 to the neutral state even when the start clutch WSC is switched to the disengaged state.

When an abnormality associated with transmission of power in the front power transmission path PTf is a breakdown in which the control state of the engagement/disengagement clutch K0 cannot be switched to the engaged state, the limp-home travel control unit 98 forcibly switches the control state of the engagement/disengagement clutch K0 to the engaged state through a predetermined first fail-safe operation FSf1 in each of the first limp-home travel mode Mlh1 and the second limp-home travel mode Mlh2. The predetermined first fail-safe operation FSf1 is, for example, a control operation of switching an oil passage in the hydraulic pressure control circuit 58 such that a K0 hydraulic pressure PRk0 with which the engaged state of the engagement/disengagement clutch K0 can be maintained is supplied to the actuator of the engagement/disengagement clutch K0 without using the solenoid valve for the engagement/disengagement clutch when a breakdown in which the K0 hydraulic pressure PRk0 is not output from the solenoid valve for the engagement/disengagement clutch in the hydraulic pressure control circuit 58 has occurred. The K0 hydraulic pressure PRk0 with which the engaged state of the engagement/disengagement clutch K0 can be maintained is, for example, a source pressure such as a line pressure which is supplied to the solenoid valve for the engagement/disengagement clutch.

When an abnormality associated with transmission of power in the front power transmission path PTf is a breakdown in which the control state of the start clutch WSC cannot be switched to the engaged state, the limp-home travel control unit 98 forcibly switches the control state of the start clutch WSC to the engaged state through a predetermined second fail-safe operation FSf2 in the first limp-home travel mode Mlh1. The predetermined second fail-safe operation FSf2 is, for example, a control operation of switching the oil passage in the hydraulic pressure control circuit 58 such that a WSC hydraulic pressure PRwsc with which the engaged state of the start clutch WSC can be maintained is supplied to the actuator of the start clutch WSC without using the solenoid valve for the start clutch when a breakdown in which the WSC hydraulic pressure PRwsc is not output from the solenoid valve for the start clutch in the hydraulic pressure control circuit 58 has occurred. The WSC hydraulic pressure PRwsc with which the engaged state of the start clutch WSC can be maintained is, for example, a source pressure such as a line pressure which is supplied to the solenoid valve for the start clutch. In the second limp-home travel mode Mlh2, the limp-home travel control unit 98 maintains the start clutch WSC at the disengaged state when a breakdown in which the start clutch WSC is disengaged has occurred and one gear stage in the automatic transmission 24 is formed. Alternatively, in the second limp-home travel mode Mlh2, the limp-home travel control unit 98 may maintain the start clutch WSC at the disengaged state when a breakdown in which the start clutch WSC is disengaged has occurred and the automatic transmission 24 is switched to the neutral state, or may forcibly switch the control state of the start clutch WSC to the engaged state through the predetermined second fail-safe operation FSf2 in synchronization with the first limp-home travel mode Mlh1.

In each of the first limp-home travel mode Mlh1 and the second limp-home travel mode Mlh2, the limp-home travel control unit 98 switches the engine 12 to an operating state. In each of the first limp-home travel mode Mlh1 and the second limp-home travel mode Mlh2, the limp-home travel control unit 98 performs starting control of the engine 12 when the engine 12 is stopped, that is, in the stopped state.

Specifically, in the first limp-home travel mode Mlh1, the limp-home travel control unit 98 switches the engine 12 to the operating state and travels using the power of the engine 12. Accordingly, engine-driven travel is performed in the first limp-home travel mode Mlh1. In the first limp-home travel mode Mlh1, the limp-home travel control unit 98 prohibits an intermittent engine operation of switching the engine 12 between the operating state and the stopped state.

Accordingly, it is not necessary to switch the control state of the engagement/disengagement clutch K0 accompanying switching of the engine 12 to the stopped state. Prohibition of the intermittent engine operation is useful particularly when the engagement/disengagement clutch K0 is forcibly switched to the engaged state. On the other hand, in the second limp-home travel mode Mlh2, the limp-home travel control unit 98 switches the engine 12 to the operating state and performs power generation using the first electric motor MG1 using the power of the engine 12. Accordingly, series travel which is a series type hybrid travel is performed in the second limp-home travel mode Mlh2.

In the first limp-home travel mode Mlh1, the limp-home travel control unit 98 sets at least the engine 12 out of the engine 12, the first electric motor MG1, and the second electric motor MG2 as the driving force source for travel. On the other hand, in the second limp-home travel mode Mlh2, the limp-home travel control unit 98 sets the second electric motor MG2 as the driving force source for travel. In the second limp-home travel mode Mlh2, the limp-home travel control unit 98 causes the second electric motor MG2 to generate a driving force for travel using electric power supplied from the battery unit 54 and/or electric power generated by the first electric motor MG1.

Figure 2:
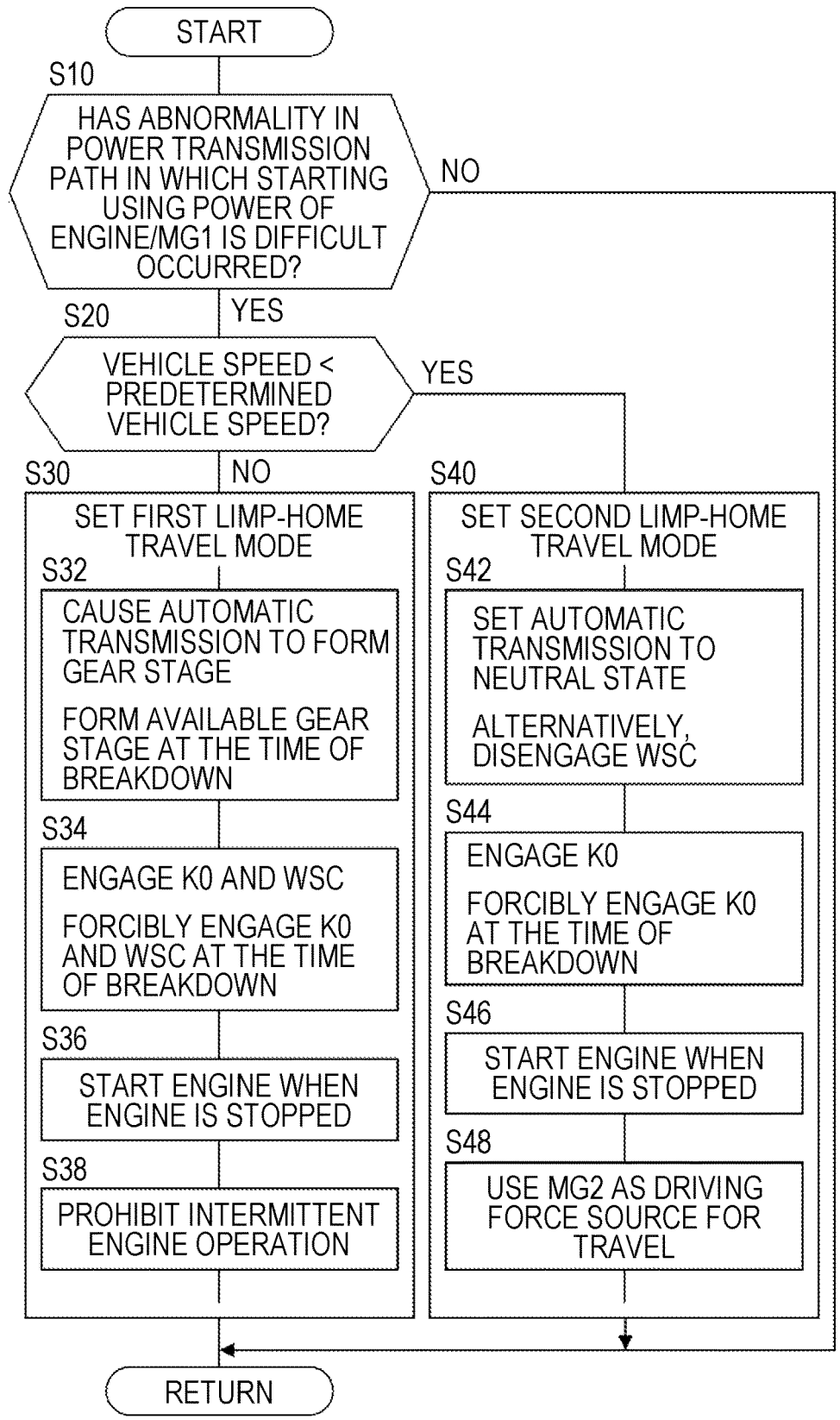
FIG. 2 is a flowchart illustrating a principal part of a control operation of an electronic control unit and illustrating a control operation for curbing a driver's uncomfortable feeling due to a decrease in power performance and curbing a decrease in starting performance when limp-home travel is performed.

FIG. 2 is a flowchart illustrating a principal part of a control operation of the electronic control unit 90 and illustrating a control operation for curbing a driver's uncomfortable feeling due to a decrease in power performance and curbing a decrease in starting performance when limp-home travel LH is performed. The control operation is, for example, repeatedly performed.

In FIG. 2, first, in Step (the word "Step" is omitted below) S10 corresponding to the function of the state determining unit 99, it is determined whether an abnormality associated with transmission of power in the front power transmission path PTf has occurred, that is, whether an abnormality in the front power transmission path PTf in which it is difficult to start the vehicle 10 using the power of the engine 12 and/or the first electric motor MG1 has occurred. When the determination result of S10 is negative, this routine ends. When the determination result of S10 is positive, it is determined whether the vehicle speed V is lower than the predetermined vehicle speed Vf in S20 corresponding to the function of the state determining unit 99. When the determination result of S20 is negative, the first limp-home travel mode Mlh1 is set as the limp-home travel mode Mlh in S30 corresponding to the function of the limp-home travel control unit 98. Specifically, in S32, one gear stage in the automatic transmission 24 is formed. Particularly, when a breakdown in which the first gear stage is unavailable has occurred, one of the available gear stages in the automatic transmission 24 is formed. In S34, the engagement/disengagement clutch K0 and the start clutch WSC are in the engaged state. Particularly, when a breakdown in which the engagement/disengagement clutch K0 is disengaged has occurred, the engagement/disengagement clutch K0 is forcibly switched to the engaged state. Alternatively, when a breakdown in which the start clutch WSC is disengaged has occurred, the start clutch WSC is forcibly switched to the engaged state. In S36, starting control of the engine 12 is performed when the engine 12 is in the stopped state. In S38, an intermittent engine operation is prohibited. In the first limp-home travel mode Mlh1, the first limp-home travel LH1 is performed using at least the power of the engine 12. On the other hand, when the determination result of S20 is positive, the second limp-home travel mode Mlh2 is set as the limp-home travel mode Mlh in S40 corresponding to the function of the limp-home travel control unit 98. Specifically, in S42, the automatic transmission 24 is switched to the neutral state or the start clutch WSC is switched to the disengaged state. In S44, the engagement/disengagement clutch K0 is switched to the engaged state. Particularly, when a breakdown in which the engagement/disengagement clutch K0 is disengaged has occurred, the engagement/disengagement clutch K0 is forcibly switched to the engaged state. In S46, starting control of the engine 12 is performed when the engine 12 is in the stopped state. In S48, the driving force source for travel is set to the second electric motor MG2. In the second limp-home travel mode Mlh2, series travel is performed and the second limp-home travel LH2 is performed using the power of the second electric motor MG2.

As described above, according to this embodiment, when an abnormality associated with transmission of power in the front power transmission path PTf has occurred and the vehicle speed V is equal to or higher than the predetermined vehicle speed Vf, the limp-home travel mode Mlh is switched to the first limp-home travel mode Mlh in which the first limp-home travel LH1 is performed in a state in which the fail-safe power transmission path PTffs in which the power of the engine 12 and the power of the first electric motor MG1 can be transmitted to the front wheels 14f is formed in the front power transmission path PTf. Accordingly, it is possible to perform limp-home travel LH using the power of the engine 12 and/or the first electric motor MG1 while the vehicle is traveling in a relatively high speed area. When an abnormality associated with power transmission in the front power transmission path PTf has occurred and the vehicle speed V is lower than the predetermined vehicle speed Vf, the limp-home travel mode Mlh is switched to the second limp-home travel mode Mlh2 in which the front power transmission path PTf is switched to a power-untransmittable state in which the power of the engine 12 and the power of the first electric motor MG1 cannot be transmitted to the front wheels 14f and the second limp-home travel LH2 is performed using the power of the second electric motor MG2. Accordingly, it is possible to perform the limp-home travel LH without using the front power transmission path PTf in which the abnormality has occurred while the vehicle is traveling in a relatively low speed area or while the vehicle is stopped. Particularly, there is a likelihood that starting performance will decrease depending on the formed fail-safe power transmission path PTffs when the limp-home travel mode Mlh is switched to the first limp-home travel mode Mlh1 while the vehicle is stopped, but since the limp-home travel mode Mlh is switched to the second limp-home travel mode Mlh2 while the vehicle is stopped, it is possible to appropriately start the vehicle 10 using the power of the second electric motor MG2. Accordingly, when the limp-home travel LH is performed, it is possible to curb a decrease in starting performance while curbing a driver's uncomfortable feeling due to a decrease in power performance.

According to this embodiment, since the driving wheels 14 include the front wheels 14f which are main driving wheels to which the power of the engine 12 and the power of the first electric motor MG1 are transmitted and the rear wheels 14r which are sub driving wheels to which the power of the second electric motor MG2 is transmitted, it is possible to appropriately perform the limp-home travel LH in each of the first limp-home travel mode Mlh1 and the second limp-home travel mode Mlh2.

According to this embodiment, when the abnormality associated with transmission of power in the front power transmission path PTf is a breakdown in which the first gear stage in the automatic transmission 24 is unavailable, one of available gear stages in the automatic transmission 24 is formed in the first limp-home travel mode Mlh1 and thus it is possible to form a fail-safe power transmission path PTffs in which the power of the engine 12 and the power of the first electric motor MG1 can be transmitted to the front wheels 14f in the front power transmission path PTf.

According to this embodiment, since the front power transmission path PTf becomes the power-untransmittable state after the engagement/disengagement clutch K0 has been switched to the engaged state in the second limp-home travel mode Mlh2, it is possible to prohibit transmission of the power of the engine 12 and the power of the first electric motor MG1 to the front wheels 14f and to cause the first electric motor MG1 to generate electric power using the power of the engine 12.

According to this embodiment, when the abnormality associated with transmission of power in the front power transmission path PTf is a breakdown in which the control state of the engagement/disengagement clutch K0 cannot be switched to the engaged state, the control state of the engagement/disengagement clutch K0 is forcibly switched to the engaged state through the predetermined first fail-safe operation FSf1 in each of the first limp-home travel mode Mlh1 and the second limp-home travel mode Mlh2. Accordingly, it is possible to perform the limp-home travel LH using the power of the engine 12 in the first limp-home travel mode Mlh1 and it is possible to cause the first electric motor MG1 to generate electric power using the power of the engine 12 in the second limp-home travel mode Mlh2.

According to this embodiment, since the start clutch WSC is switched to the disengaged state or the automatic transmission 24 is switched to a power-untransmittable state in the second limp-home travel mode Mlh2, it is possible to prohibit transmission of the power of the engine 12 and the power of the first electric motor MG1 to the front wheels 14f.

According to this embodiment, when the abnormality associated with transmission of power in the front power transmission path PTf is a breakdown in which the control state of the start clutch WSC cannot be switched to the engaged state, the control state of the start clutch WSC is forcibly switched to the engaged state through the predetermined second fail-safe operation FSf2 in the first limp-home travel mode Mlh1. Accordingly, it is possible to perform the limp-home travel LH using the power of the engine 12 and/or the first electric motor MG1.

According to this embodiment, since the limp-home travel LH using the power of the engine 12 is performed by switching the engine 12 to the operating state in the first limp-home travel mode Mlh1, it is possible to curb a driver's uncomfortable feeling due to a decrease in power performance. On the other hand, since the first electric motor MG1 generates electric power using the power of the engine 12 by switching the engine 12 to the operating state in the second limp-home travel mode Mlh2, it is possible to perform series type hybrid travel and to easily maintain the limp-home travel LH using the power of the second electric motor MG2.

According to this embodiment, since an intermittent engine operation is prohibited in the first limp-home travel mode Mlh1, it is possible to maintain the operating state of the engine 12 and it is not necessary to perform control for separating the engine 12 from the front power transmission path PTf which needs to be performed at the time of stopping of the engine 12. That is, when the engine 12 is not switched to the stopped state in the first limp-home travel mode Mlh1, it is not necessary to perform control for switching the control state of the engagement/disengagement clutch K0 which needs to be performed at the time of the intermittent engine operation.

Another embodiment of the disclosure will be described below. In the following description, parts common to the embodiments will be designated by the same reference signs and description thereof will not be repeated.

Second Embodiment

In the first embodiment, when an abnormality associated with transmission of power in the front power transmission path PTf has occurred, the first limp-home travel mode Mlh1 is set when the vehicle speed V is equal to or higher than the predetermined vehicle speed Vf, and the second limp-home travel mode Mlh2 is set when the vehicle speed V is lower than the predetermined vehicle speed Vf. Switching between the first limp-home travel mode Mlh1 and the second limp-home travel mode Mlh2 depending on the vehicle speed V makes vehicle control complicated. On the other hand, in the second limp-home travel mode Mlh2, it is possible to secure traveling performance and to secure starting performance. In other words, in a normal state in which the limp-home travel mode Mlh is not set, a driver is likely to feel uncomfortable due to a decrease in power performance when an abnormality associated with transmission of power in the front power transmission path PTf has occurred while the vehicle is traveling in a high speed area equal to or higher than the predetermined vehicle speed Vf and the limp-home travel LH using the power of the engine 12 cannot be performed. On the other hand, when the vehicle speed V increases to equal to or higher than the predetermined vehicle speed Vf by maintaining the second limp-home travel mode Mlh2, a driver is less likely to feel uncomfortable due to a decrease in power performance even when the limp-home travel LH using the power of the engine 12 cannot be performed. Accordingly, when the vehicle speed V is equal to or higher than the predetermined vehicle speed Vf and the vehicle speed V becomes lower than the predetermined vehicle speed Vf after the first limp-home travel mode Mlh1 has been set, the limp-home travel mode is switched to the second limp-home travel mode Mlh2, but when the second limp-home travel mode Mlh2 has been already set, the limp-home travel mode may not be switched to the first limp-home travel mode Mlh1 but the second limp-home travel mode Mlh2 may be maintained even when the vehicle speed V increases to equal to or higher than the predetermined vehicle speed Vf after the vehicle has been started or while the vehicle is traveling in a low speed area lower than the predetermined vehicle speed Vf.

Therefore, when the limp-home travel mode Mlh is the second limp-home travel mode Mlh2, the limp-home travel control unit 98 maintains the second limp-home travel mode Mlh2 without switching the second limp-home travel mode Mlh2 to the first limp-home travel mode Mlh1 even if the vehicle speed V is equal to or higher than the predetermined vehicle speed Vf.

When it is determined that an abnormality associated with transmission of power in the front power transmission path PTf has occurred and it is determined that the vehicle speed V is equal to or higher than the predetermined vehicle speed Vf, the state determining unit 99 determines whether the second limp-home travel mode Mlh2 is set as the limp-home travel mode Mlh, that is, whether the second limp-home travel mode Mlh2 has been set.

When the state determining unit 99 determines that an abnormality associated with transmission of power in the front power transmission path PTf has occurred, determines that the vehicle speed V is equal to or higher than the predetermined vehicle speed Vf, and determines that the second limp-home travel mode Mlh2 has been set, the limp-home travel control unit 98 maintains the second limp-home travel mode Mlh2. On the other hand, when the state determining unit 99 determines that an abnormality associated with transmission of power in the front power transmission path PTf has occurred, determines that the vehicle speed V is equal to or higher than the predetermined vehicle speed Vf, and determines that the second limp-home travel mode Mlh2 has not been set, the limp-home travel control unit 98 sets the first limp-home travel mode Mlh1 as the limp-home travel mode Mlh.

Figure 3:
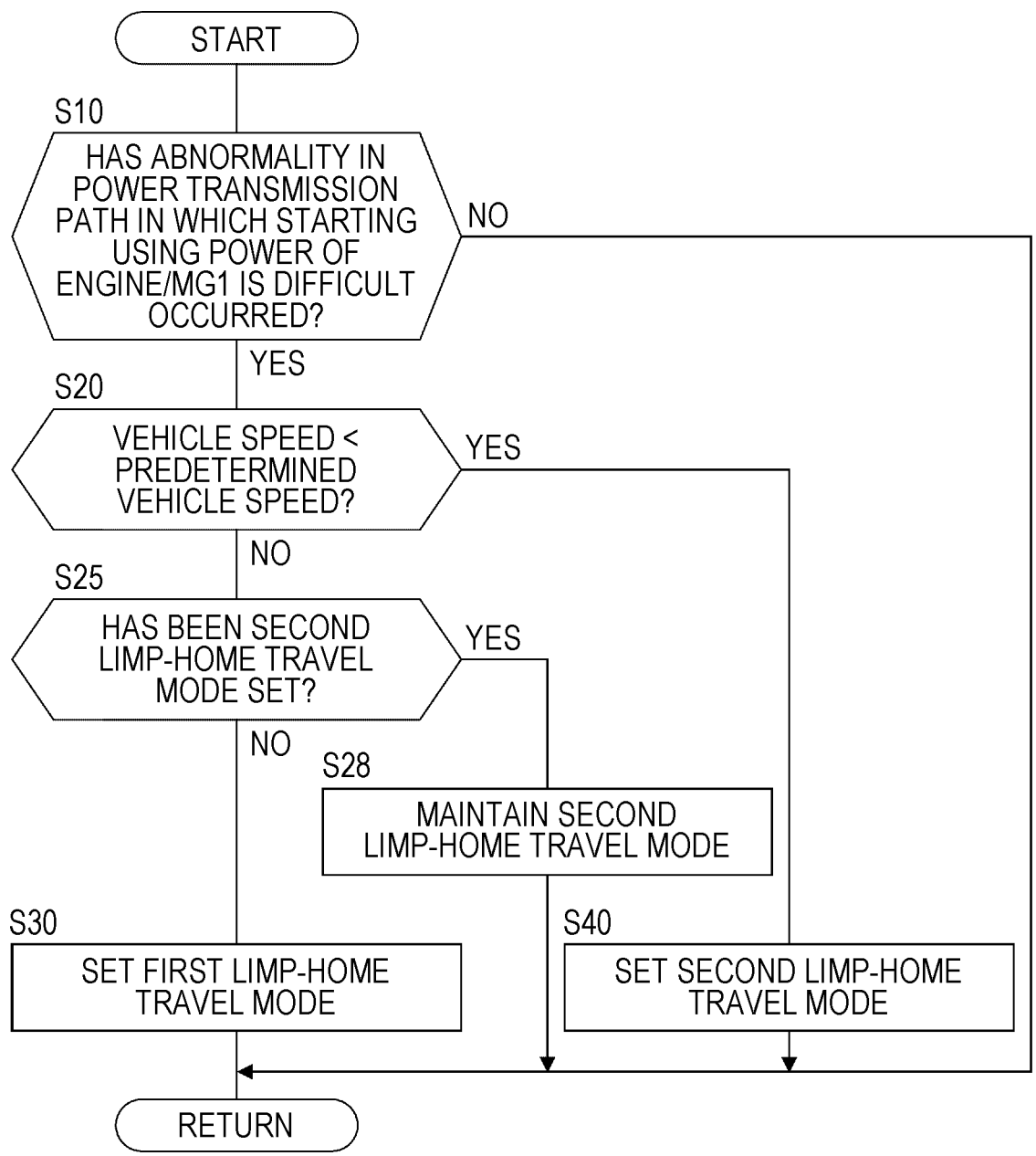
FIG. 3 is a flowchart illustrating a principal part of a control operation of the electronic control unit, illustrating a control operation for curbing a driver's uncomfortable feeling due to a decrease in power performance and curbing a decrease in starting performance when limp-home travel is performed, and illustrating a different example from FIG. 2.

FIG. 3 is a flowchart illustrating a principal part of a control operation of the electronic control unit 90 and illustrating a control operation for curbing a driver's uncomfortable feeling due to a decrease in power performance and curbing a decrease in starting performance when limp-home travel LH is performed. The control operation is, for example, repeatedly performed. FIG. 3 illustrates an example other than the example illustrated in FIG. 2 in the first embodiment. Differences of FIG. 3 from FIG. 2 will be described below.

In FIG. 3, when the determination result of S20 is negative, it is determined whether the second limp-home travel mode Mlh2 has been set in S25 corresponding to the function of the state determining unit 99. When the determination result of S25 is positive, the second limp-home travel mode Mlh2 is maintained in S28 corresponding to the function of the limp-home travel control unit 98. On the other hand, when the determination result of S25 is negative, the routine proceeds to S30. On the other hand, when the determination result of S20 is positive, the routine proceeds to S40.

As described above, according to this embodiment, the same advantages as in the first embodiment are obtained.

In addition, according to this embodiment, when the limp-home travel mode Mlh is the second limp-home travel mode Mlh2 and the vehicle speed V becomes equal to or higher than the predetermined vehicle speed Vf, the second limp-home travel mode Mlh2 is not switched to the first limp-home travel mode Mlh1 but the second limp-home travel mode Mlh2 is maintained and thus it is possible to simplify switching of the limp-home travel mode Mlh. In other words, when the second limp-home travel mode Mlh2 is maintained while the vehicle is traveling in a relatively low speed area or while the vehicle is stopped and the vehicle speed V increases to a relatively high speed area, it is possible to further curb a driver's uncomfortable feeling due to a decrease in power performance in comparison with a case in which the limp-home travel LH using the power of the engine 12 cannot be performed when an abnormality in the front power transmission path PTf has occurred while the vehicle is traveling in the relatively high speed area.

While embodiments of the disclosure have been described above in detail with reference to the accompanying drawings, the disclosure may be applied to other aspects.

For example, in the aforementioned embodiments, the engagement/disengagement clutch K0 and the start clutch WSC may be switched to the engaged state in the second limp-home travel mode Mlh2 in the same way as in the first limp-home travel LH1. Accordingly, even when the limp-home travel mode Mlh is switched to the first limp-home travel mode Mlh1 and the second limp-home travel mode Mlh2, the control states of the engagement/disengagement clutch K0 and the start clutch WSC do not need to be switched. In this case, in the second limp-home travel mode Mlh2, the automatic transmission 24 is switched to a power-untransmittable state. In this regard, when the abnormality associated with transmission of power in the front power transmission path PTf is a breakdown in which the control state of the engagement/disengagement clutch K0 cannot be switched to the engaged state or a breakdown in which the control state of the start clutch WSC cannot be switched to the engaged state, the control state of the engagement/disengagement clutch K0 and the control state of the start clutch WSC may be forcibly switched to the engaged state by predetermined fail-safe operations FSf in the first limp-home travel mode Mlh 1 and the second limp-home travel mode Mlh2.

In the aforementioned embodiments, the vehicle 10 is a four-wheel-drive vehicle in which the main driving wheels to which the power of the engine 12 and the power of the first electric motor MG1 are transmitted are the front wheels 14f and the sub driving wheels to which the power of the second electric motor MG2 is transmitted are the rear wheels 14r, but the disclosure is not limited to the aspect. For example, the disclosure can also apply to a four-wheel-drive vehicle in which the main driving wheels are the rear wheels and the sub driving wheels are the front wheels. Alternatively, the disclosure can also apply to a vehicle of an FF (front engine-front drive) type, a vehicle of an FR (front engine-rear drive) type, or the like in which the second electric motor MG2 is connected to a power transmission path between the automatic transmission 24 and the driving wheels to which the power of the engine 12 and the power of the first electric motor MG1 are transmitted via the automatic transmission 24 in a power-transmittable manner and the power of the second electric motor MG2 is transmitted to the driving wheels without using the automatic transmission 24.

In the aforementioned embodiments, the first gear stage has been exemplified above as the low-speed gear stage which is used to start the vehicle 10, but the disclosure is not limited to the aspect. For example, when a second gear stage which is on a higher-speed side than the first gear stage can be used to start the vehicle 10 in addition to the first gear stage, the low-speed gear stage used to start the vehicle 10 is the first gear stage or the second gear stage. In this case, a breakdown in which the low-speed gear stage used to start the vehicle 10 is unavailable is a breakdown in which both the first gear stage and the second gear stage in the automatic transmission 24 are unavailable.

In the aforementioned embodiments, when the second limp-home travel mode Mlh2 has been set as the limp-home travel mode Mlh, the engine 12 is switched to the operating state, but the disclosure is not limited to the aspect. For example, in the second limp-home travel mode Mlh2, the engine 12 may be switched to the operating state according to necessity such as when the dischargeable electric power Wout of the battery unit 54 is not sufficient for necessary drive power Pr from the second electric motor MG2 and when charging of the battery unit 54 is necessary.

In the aforementioned embodiments, a starting method of igniting the engine 12 in synchronization with cranking of the engine 12 in a transient state from the disengaged state to the engaged state of the engagement/disengagement clutch K0 and starting the operation of the engine 12 has been exemplified above as a method of starting the engine 12, but the disclosure is not limited to the aspect. For example, the method of starting the engine 12 may employ a starting method of igniting the engine 12 after cranking the engine 12 until the engagement/disengagement clutch K0 is switched to a fully engaged state or a state close to the fully engaged state. When the MG1 rotation speed Nm1 is zero and the vehicle 10 is stopped, a starting method of igniting the engine 12 after cranking the engine 12 using the first electric motor MG1 in a state in which the engagement/ disengagement clutch K0 is in the fully engaged state can be employed. The starter 62 which is a dedicated motor for cranking the engine 12 is provided in the vehicle 10. Accordingly, when the MG1 rotation speed Nm1 is zero and the vehicle 10 is stopped, for example, when cranking using the first electric motor MG1 is not sufficiently performed or impossible because the outside air temperature is very low, a starting method of igniting the engine 12 after cranking the engine 12 using the starter 62 can be employed.

In the aforementioned embodiments, a planetary gear type automatic transmission has been described above as the automatic transmission 24 constituting a part of the power transmission path which is formed such that the power of the engine 12 and the power of the first electric motor MG1 can be transmitted to the driving wheels 14, but the disclosure is not limited to the example. For example, a synchromesh parallel biaxial automatic transmission including a known dual clutch transmission (DCT) or a known belt type stepless transmission may be used as the automatic transmission 24. When the automatic transmission 24 is a belt type stepless transmission, the automatic transmission 24 includes a belt type stepless transmission and a known forward/rearward movement switching device. When the automatic transmission 24 is a belt type stepless transmission, for example, the automatic transmission 24 is switched to a power-untransmittable state by setting a forward clutch and a rearward brake in the forward/rearward movement switching device to a disengaged state.

The aforementioned embodiments are merely examples and the disclosure can be embodied in aspects subjected to various modifications and improvements based on the knowledge of those skilled in the art.

What is claimed is:

1. A control device for a vehicle, the vehicle including an engine, a first electric motor that is connected to the engine in a power-transmittable manner, an automatic transmission that constitutes a part of a power transmission path which is formed such that power of the engine and power of the first electric motor are able to be transmitted to driving wheels, and a second electric motor that is configured to transmit power of the second electric motor to the driving wheels without passing through the automatic transmission, the control device comprising:
    a limp-home travel control unit configured to, when an abnormality associated with power transmission in the power transmission path has occurred, alternatively switch a limp-home travel mode in which predetermined limp-home travel is able to be performed between:
        a first limp-home travel mode in which limp-home travel is performed in a state in which a fail-safe power transmission path in which the power of the engine and the power of the first electric motor are able to be transmitted to the driving wheels is formed in the power transmission path when a vehicle speed is equal to or higher than a predetermined vehicle speed; and
        a second limp-home travel mode in which the power transmission path is switched to a power-untransmittable state in which the power of the engine and the power of the first electric motor are not able to be transmitted to the driving wheels and limp-home travel is performed using power of the second electric motor when the vehicle speed is lower than the predetermined vehicle speed.

2. The control device for a vehicle according to claim 1, wherein the driving wheels include main driving wheels to which the power of the engine and the power of the first electric motor are transmitted and sub driving wheels to which the power of the second electric motor is transmitted.

3. The control device for a vehicle according to claim 1, wherein the limp-home travel control unit is configured to form one of available gear stages in the automatic transmission in the first limp-home travel mode when the abnormality in the power transmission path is a breakdown in which a low-speed gear stage used to start the vehicle in the automatic transmission is unavailable.

4. The control device for a vehicle according to claim 1, wherein the first electric motor is connected between the engine and the automatic transmission in the power transmission path in a power-transmittable manner, and
    wherein the limp-home travel control unit is configured to switch the power transmission path to a power-untransmittable state after switching an engagement/disengagement clutch that is provided between the engine and the first electric motor in the power transmission path and cuts off connection between the engine and the first electric motor to an engaged state in the second limp-home travel mode.

5. The control device for a vehicle according to claim 4, wherein the limp-home travel control unit is configured to forcibly switch a control state of the engagement/disengagement clutch to an engaged state through a predetermined first fail-safe operation in each of the first limp-home travel mode and the second limp-home travel mode when the abnormality in the power transmission path is a breakdown in which the control state of the engagement/disengagement clutch is not able to be switched to the engaged state.

6. The control device for a vehicle according to claim 1, wherein the limp-home travel control unit is configured to switch a start clutch, which is provided between the engine and the first electric motor and the automatic transmission in the power transmission path and that is switched from a disengaged state to an engaged state via a slipping state at the time of starting of the vehicle in a state in which the engine is operating, to a disengaged state or to switch the automatic transmission to a power-untransmittable state in the second limp-home travel mode.

7. The control device for a vehicle according to claim 6, wherein the limp-home travel control unit is configured to forcibly switch the control state of the start clutch to the engaged state through a predetermined second fail-safe operation in the first limp-home travel mode when the abnormality in the power transmission path is a breakdown in which the control state of the start clutch is not able to be switched to the engaged state.

8. The control device for a vehicle according to claim 1, wherein the limp-home travel control unit is configured to cause the vehicle to travel using the power of the engine by switching the engine to an operating state in the first limp-home travel mode and to cause the first electric motor to generate electric power using the power of the engine by switching the engine to the operating state in the second limp-home travel mode.

9. The control device for a vehicle according to claim 8, wherein the limp-home travel control unit is configured to prohibit an intermittent engine operation of switching the engine between an operating state and a stopped state in the first limp-home travel mode.

10. The control device for a vehicle according to claim 1, wherein the limp-home travel control unit is configured to maintain the second limp-home travel mode without switching the second limp-home travel mode to the first limp-home travel mode when the limp-home travel mode is the second limp-home travel mode and the vehicle speed is equal to or higher than the predetermined vehicle speed.

* * * * *